United States Patent [19]

Ohta

[11] Patent Number: 6,154,635
[45] Date of Patent: Nov. 28, 2000

[54] ANTENNA DRIVING DEVICE FOR TRANSPONDER

[75] Inventor: Mitsuru Ohta, Kobe, Japan

[73] Assignee: Fujitsu Ten Limited, Hyogo, Japan

[21] Appl. No.: 08/945,097

[22] PCT Filed: Jun. 19, 1996

[86] PCT No.: PCT/JP96/01678

§ 371 Date: Mar. 25, 1998

§ 102(e) Date: Mar. 25, 1998

[87] PCT Pub. No.: WO97/01223

PCT Pub. Date: Jan. 9, 1997

[30] Foreign Application Priority Data

Jun. 22, 1995 [JP] Japan ................................. 7-156451

[51] Int. Cl.[7] .............................. H04B 5/00; H04M 9/00
[52] U.S. Cl. .......................... 455/41; 379/55.1; 340/10.4; 340/870.31
[58] Field of Search ............................. 342/374; 70/257; 343/866; 455/41; 379/55.1; 340/10.3, 10.4, 10.41, 10.42, 10.1, 825.31, 870.31, 854.8

[56] References Cited

U.S. PATENT DOCUMENTS 5,250,944 10/1993 Urbas et al. .................... 340/870.31
6,028,503 2/2000 Preishuberpflugl et al. .......... 340/10.4
6,035,677 3/2000 Janssen et al. ........................ 70/278.3
6,043,752 3/2000 Hisada et al. ..................... 340/825.31

FOREIGN PATENT DOCUMENTS

5-281347 10/1993 Japan .

Primary Examiner—Dwayne D. Bost
Assistant Examiner—Tracy M. Legree
Attorney, Agent, or Firm—Wenderoth, Lind & Ponack, L.L.P.

[57] ABSTRACT

An antenna coil (21) for generating a magnetic field (25) to supply power to a transponder (26) is energized through switching devices (23 and 24) connected between Vcc and GND of a D.C. power supply (20) and having contacts S1 and S2 that are actuated in opposite phases in accordance with a carrier signal. Both of the switching devices (23 and 24) are turned OFF while the carrier signal is absent. Accordingly, the oscillating current flowing through a series resonance circuit of the antenna coil (21) and a capacitor (22) quickly attenuates, thereby dropping the intensity of the magnetic field (25).

12 Claims, 8 Drawing Sheets

TO RECEIVING CIRCUIT

ANTENNA DRIVING DEVICE FOR TRANSPONDER

TECHNICAL FIELD

The present invention relates to an antenna driving device for a transponder for generating a magnetic field which is magnetically coupled to a transponder incorporated and used in an automobile key.

BACKGROUND ART

Figure 10:
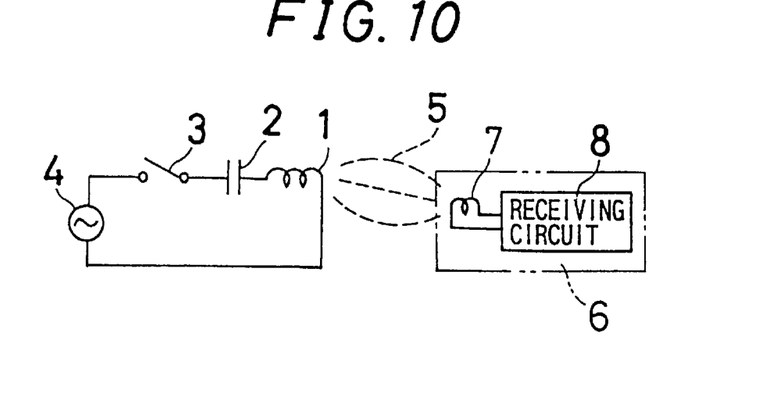
FIG. 10 is an electrical circuit diagram showing a configuration of a conventional transponder.

A transponder is actuated by electromagnetic energy in a radio signal generated by an interrogator and transmits various data to the interrogator, for example, as disclosed in Japanese unexamined patent publication JP-A 5-281347 (1993). With a transponder incorporated in an automobile key, the key can be automatically identified, which is useful in preventing the automobile from being stolen. FIG. 10 shows a fundamental configuration associated with such a transponder. In an interrogator, an antenna coil 1 and a resonant capacitor 2 are connected in series, and a carrier signal source 4 is connected thereto through a switch 3. When the switch 3 is closed, a magnetic field 5 is generated at the antenna coil 1 in accordance with a signal from the carrier signal source 4 to excite an antenna coil 7 of a transponder 6. The transponder 6 accumulates energy from the magnetic field 5 as electric power by a receiving circuit 8, and transmits a predetermined certain identification code and the like from the antenna coil 7 to the antenna coil 1 using the accumulated electric energy.

Figure 11:
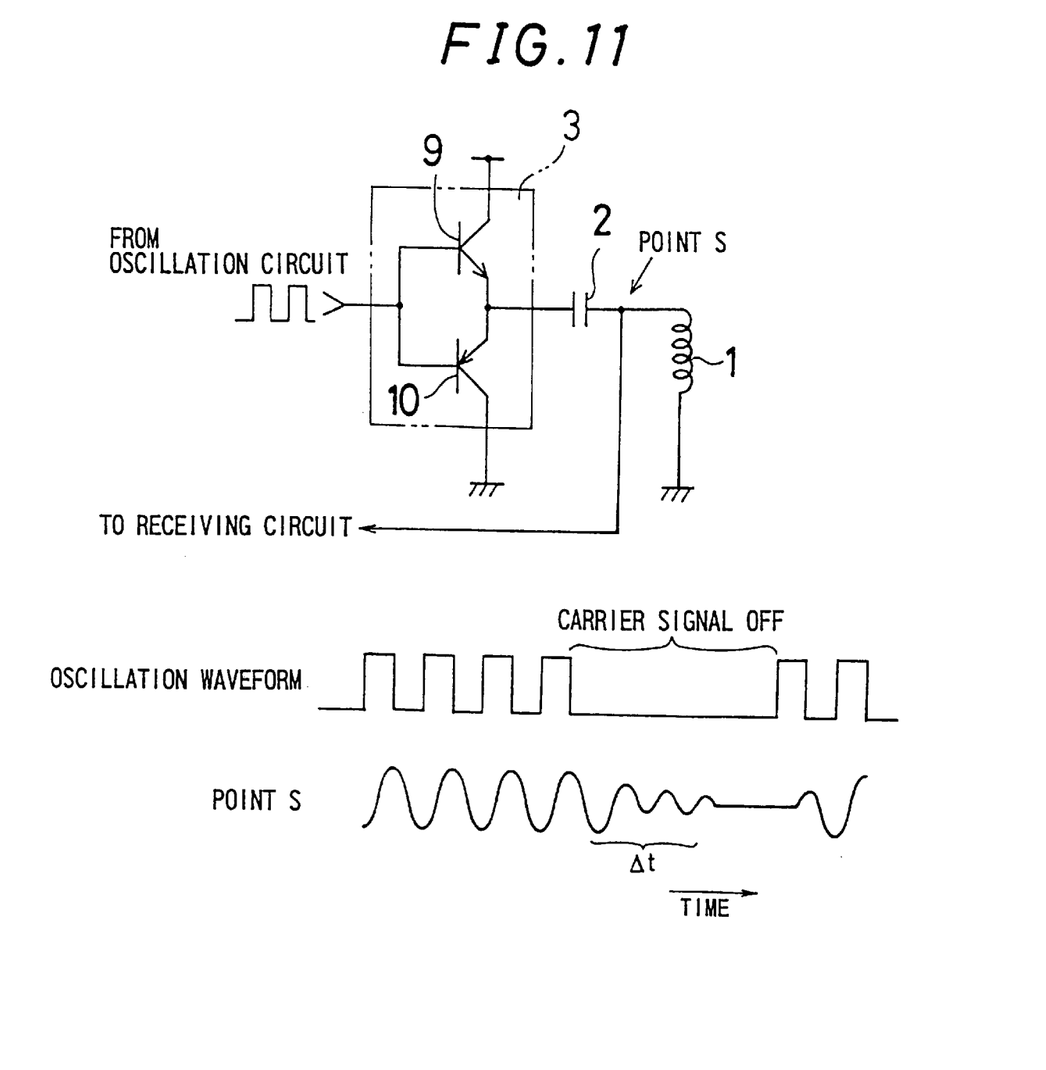
FIG. 11 is an electrical circuit diagram and waveform diagrams showing a fundamental configuration of a conventional antenna driving device for a transponder.

In upper and lower halves of FIG. 11, there are respectively shown an electrical configuration of a driving circuit which drives the antenna coil 1 to supply electric power to the transponder 6, and signal waveforms during control over the magnetically coupled transponder as shown in FIG. 10. The switch 3 consists of an NPN transistor 9 and a PNP transistor 10. When a carrier signal from the carrier signal source 4 is supplied as a rectangular wave having an oscillation waveform at a frequency which is close to the resonant frequency of the antenna coil 1 and the resonant capacitor 2, the transistor 9 and the transistor 10 alternately conduct to provide a waveform which resembles a sine wave at a point S. The supply voltage Vcc is on the order of 5 V, and a current of, for example, 200 mA flows to the series resonant circuit of the antenna coil 1 and the resonant capacitor 2. A magnetically coupled transponder is provided with a halt period during which the carrier signal is turned off and a signal from the transponder is received or data are transmitted to the transponder by turning the carrier signal on and off.

According to the prior art as shown in FIG. 11, the waveform at the point S takes a long time Δt to attenuate even when the carrier signal having a rectangular waveform is turned off. When there is such a long attenuation time Δt during AM modulation by turning the carrier signal on and off, a long time is spent before a complete halt occurs even when the carrier signal is turned off, which disallows data communication at a high speed.

It is an object of the invention to provide an antenna driving device for a transponder, capable of rapidly attenuating an output during periods when the carrier signal is halted.

SUMMARY OF INVENTION

The invention provides an antenna driving device for a transponder which drives an antenna coil in accordance with a carrier signal in order to generate a magnetic field for a magnetically coupled transponder, which device comprises:

a resonant circuit in which an antenna coil and a resonant capacitor are connected in series;

switching means for alternately switching between a state in which the resonant circuit forms a closed loop including a DC power supply for providing a current flowing in one direction, and a state in which a closed loop is formed for providing a current flowing in another direction in accordance with the carrier signal; and controlling means for controlling the switching means such that the closed loop of the resonant circuit is maintained when the carrier signal continues and such that the closed loop of the resonant circuit is disconnected when the carrier signal is halted.

Further, the invention provides an antenna driving device which drives an antenna coil in accordance with a carrier signal for supplying electric power to a magnetically coupled transponder, which device comprises:

a resonant circuit in which an antenna coil and a resonant capacitor are connected in series;

switching means for alternately switching between a state in which the resonant circuit forms a closed loop including a DC power supply for providing a current flowing in one direction, and a state in which a closed loop is formed for providing a current flowing in another direction in accordance with the carrier signal; and controlling means for controlling the switching means such that the closed loop of the resonant circuit is maintained when the carrier signal continues and such than the closed loop of the resonant circuit is disconnected when the carrier signal is halted.

The invention is characterized in that the switching means comprises:

one switching element connected between one output of the DC power supply and one end of the resonant circuit and alternately switched between a conducting state and a cutoff state in accordance with the carrier signal; and another switching element connected between another output of the DC power supply and the one end of the resonant circuit and alternately switched between a conducting state and a cutoff state in accordance with the carrier signal, such that the another switching element is in the phase opposite to that of the one switching element, and that the controlling means controls such that the one and another switching elements are simultaneously in the cutoff states when the carrier signal is halted.

Further, the invention is characterized in that the switching means comprises:

a change-over switching element for switching such that one end of the resonant circuit is alternately connected to the one and another outputs of the DC power supply in accordance with the carrier signal; and an on-off switching element connected to another end of the resonant circuit and the another output of the DC power supply, which is in a conducting state when the carrier signal continues, and that the controlling means controls such that the on-off switching element is in a cutoff state when the carrier signal is halted.

Further, the invention is characterized in that the switching means comprises a change-over switching element and an on-off switching element, and the change-over switching element is alternately switched to connect one end of the resonant circuit to one output of the DC power supply, or to connect the one end of the resonant circuit to another output of the DC power supply through the on-off switching element in accordance with the carrier signal; and the controlling means controls such that the on-off switching element is in a conducting state when the carrier signal continues and the on-off switching element is in a cutoff state when the carrier signal is halted.

Further, the invention is characterized in that the switching means comprises:

a first switching element for connecting or disconnecting one end of the resonant circuit and one output of the DC power supply in accordance with the carrier signal;

a second switching element for connecting or disconnecting the one end of the resonant circuit and another output of the DC power supply in accordance with the carrier signal such that the second switching element is in the phase opposite to that of the first switching element;

a third switching element for connecting or disconnecting another end of the resonant circuit and the one output of the DC power supply in accordance with the carrier signal such that the third switching element is in the phase opposite to that of the first switching element;

a fourth switching element for connecting or disconnecting the another end of the resonant circuit and the another output of the DC power supply in accordance with the carrier signal such that the forth switching element is in the same phase as that of the first switching element, and that the controlling means controls such that at least either the first and second switching elements or the third and fourth elements are simultaneously in a cutoff state when the carrier signal is halted.

Further, the invention is characterized in that, the controlling means controls the switching means such that the resonant circuit forms a closed loop to allow reception of a signal from the transponder.

According to the invention, a resonant circuit in which an antenna coil and a resonant capacitor are connected in series is alternately switched in accordance with a carrier signal by switching means between a state in which the resonant circuit forms a closed loop including a DC power supply to provide a current flowing in one direction, and a state in which a closed loop is formed to provide a current flowing in another direction, thereby establishing magnetic coupling to a transponder by a magnetic field generated by the antenna coil. Since the closed loop of the resonant circuit is disconnected by control means during a halt of the carrier signal, the current flowing through the antenna coil immediately attenuates to allow data transmission at a high speed.

Further, according to the invention, a resonant circuit in which an antenna coil and a resonant capacitor are connected in series is alternately switched in accordance with a carrier signal by switching means between a state in which the resonant circuit forms a closed loop including a DC power supply to provide a current flowing in one direction, and a state in which a closed loop is formed to provide a current flowing in another direction, thereby supplying electric power from the antenna coil to a transponder. Since the closed loop of the resonant circuit is disconnected by control means during a halt of the carrier signal, the current flowing through the antenna coil immediately attenuates to allow data transmission at a high speed.

Further, according to the invention, while one switching element conducts, another switching element cuts off to let a current flow through the resonant circuit in one direction. The another switching element conducts while the one switching element cuts off, and electric power which has been accumulated in the resonant circuit causes a current to flow through the resonant circuit in another direction. An electromagnetic wave is output by the antenna coil to electrically energize the transponder in accordance with the carrier signal. Since the controlling means controls such that the one and the another switching elements are in a cutoff state simultaneously during a halt of the carrier signal, the current flowing through the antenna coil of the resonant circuit rapidly attenuates.

Further, according to the invention, the resonant circuit is switched by an on-off switching element between a state in which a current from the DC power supply flows in one direction, and a state in which a current accumulated in the resonant circuit is discharged and flows in another direction, thereby radiating electric power to drive the transponder from the antenna coil. When the carrier signal is halted, since the on-off switching element is disconnected by the controlling means to disconnect the another end of the resonant circuit and the another output of the DC power supply, the current flowing through the antenna coil rapidly attenuates, which result in rapid attenuation of the output of the antenna coil.

Further, according to the invention, a state in which a current flows in one direction through the first switching element and the fourth switching element, and a state in which a current flows in another direction through the second switching element and the third switching element are alternately switched between the resonant circuit and the DC power supply, so that an electromagnetic wave for driving the transponder is output from the antenna coil. Since the controlling means disconnects simultaneously at least either the first switching element and the second switching element, or the third switching element and the fourth switching element, the current flowing through the resonant circuit rapidly attenuates.

Further, according to the invention, since the controlling means controls the switching means such that a closed loop is formed by the resonant circuit in a receiving state, a signal from the transponder can be received with high sensitivity.

DETAILED DESCRIPTION OF THE INVENTION

Figure 1:
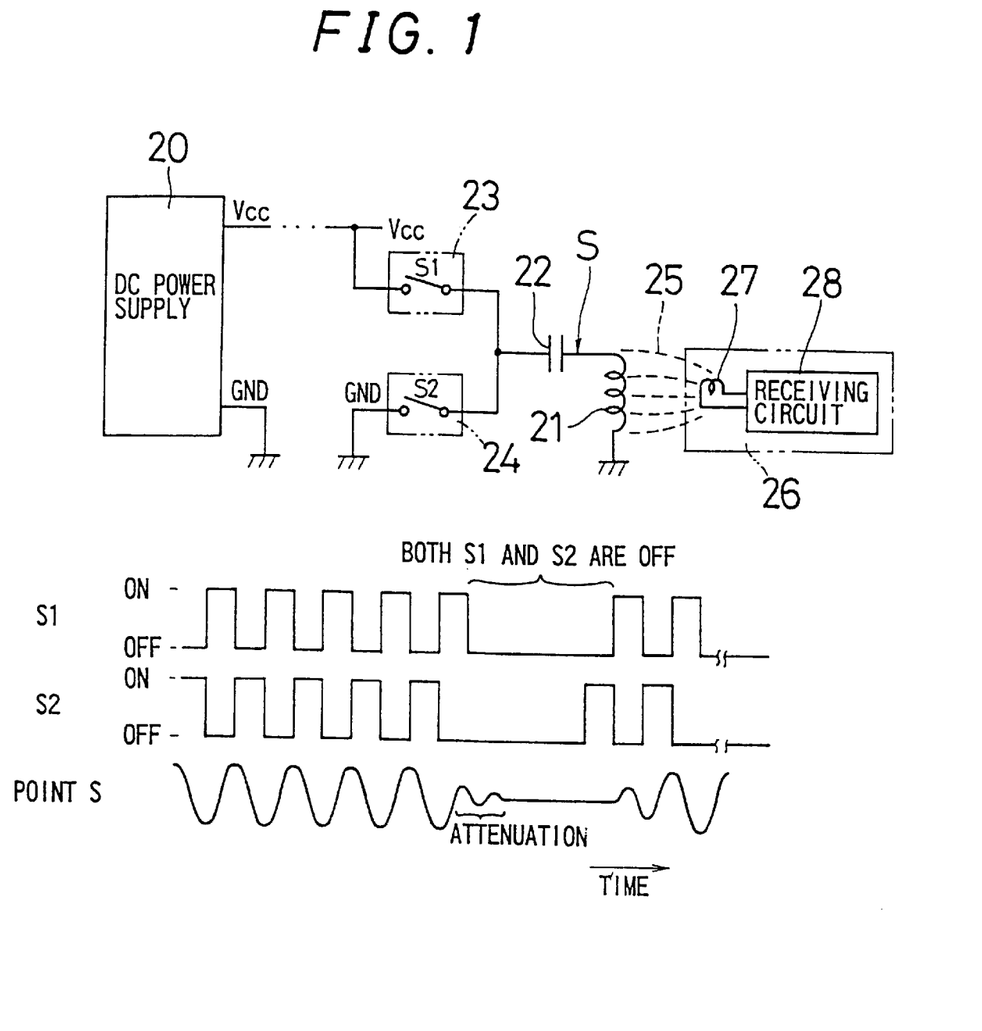
FIG. 1 is an electrical circuit diagram and waveform diagrams showing a fundamental configuration of an embodiment of the invention.

FIG. 1 shows a basic configuration of an embodiment of the invention in the upper half and operational waveforms of constituent parts thereof in the lower half. In an interrogator, a DC power supply 20 can constitute a closed loop configured by being connected to a series resonant circuit including an antenna coil 21 and a resonant capacitor 22 between Vcc as one output and GND as another output. A one switching element 23 is connected between one end of the series resonant circuit and the Vcc of the DC power supply 20, and another end of the resonant circuit is grounded to the GND. An another switching element 24 is connected between the one end of the resonant circuit and the GND of the DC power supply. The one switching element 23 and the another switching element 24 are implemented using semiconductor switching elements such as bipolar transistors and FETs.

The one switching element 23 is controlled such that it is alternately in ON and OFF states as indicated by the operational waveform S1. The another switching element 24 is controlled to be in the phase opposite to that of the one switching element 23 as indicated by the operational waveform S2. Thus, an output waveform like a sine wave is obtained at a point S. The antenna coil 21 outputs a magnetic field 25 corresponding to the waveform at the point S. This magnetic field 25 is received by an antenna coil 27 of a transponder 26 to be used as electric power to operate a receiving circuit 28.

When both of the one switching element 23 and another switching element 24 are put in a cutoff state which is an OFF state at the interrogator, the resonant circuit formed by the antenna coil 21 and the resonant capacitor 22 no longer forms a closed loop, which results in rapid attenuation of the output waveform at the point S. Thus, a repeat cycle in transmitting data to the transponder 26 by repeating the continuation and halt of the carrier signal for control can be shortened, thereby increasing the data transmission speed.

Figure 2:
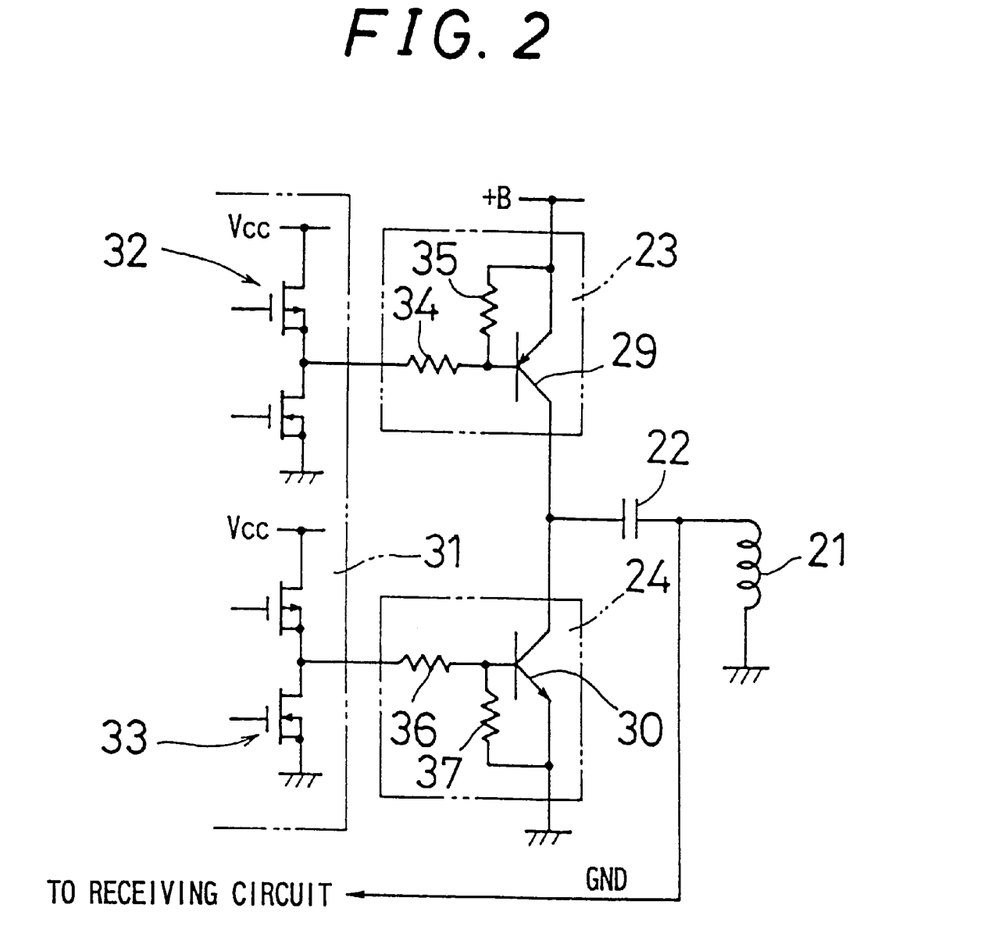
FIG. 2 is an electrical circuit diagram showing an electrical configuration of the embodiment in FIG. 1.

FIG. 2 shows an example of a specific configuration of the interrogator of the embodiment shown in FIG. 1. The one switching element 23 is implemented using a PNP-type transistor 29, and the another switching element 24 is implemented using an NPN-type transistor 30. A microcomputer 31 as controlling means includes output circuits 32, 33 through which the transistors 29, 30 are driven separately. An input resistor 34 is connected between the output circuit 32 and a base of the transistor 29, and a bias resistor 35 is connected between the base and an emitter of the transistor 29. An input resistor 36 is connected between the output circuit 33 and a base of the transistor 30, and a bias resistor 37 is connected between the base and an emitter of the transistor 30. A collector of the transistor 29 and a collector of the transistor 30 are commonly connected to the one end of the resonant capacitor 22. The emitter of the transistor 29 is connected to +B which is the one output of the DC power supply, and the emitter of the transistor 30 is grounded to GND which is another output of the DC power supply. An input signal to the receiving circuit is taken out from a point at which another end of the resonant capacitor 22 and one end of the antenna coil 21 are connected. The other end of the antenna coil 21 is grounded.

With the configuration shown in FIG. 2, high speed switching can be performed without any additional parts or circuits by adjusting the output timing of the output circuits 32, 33 of the microcomputer 31.

Figure 3:
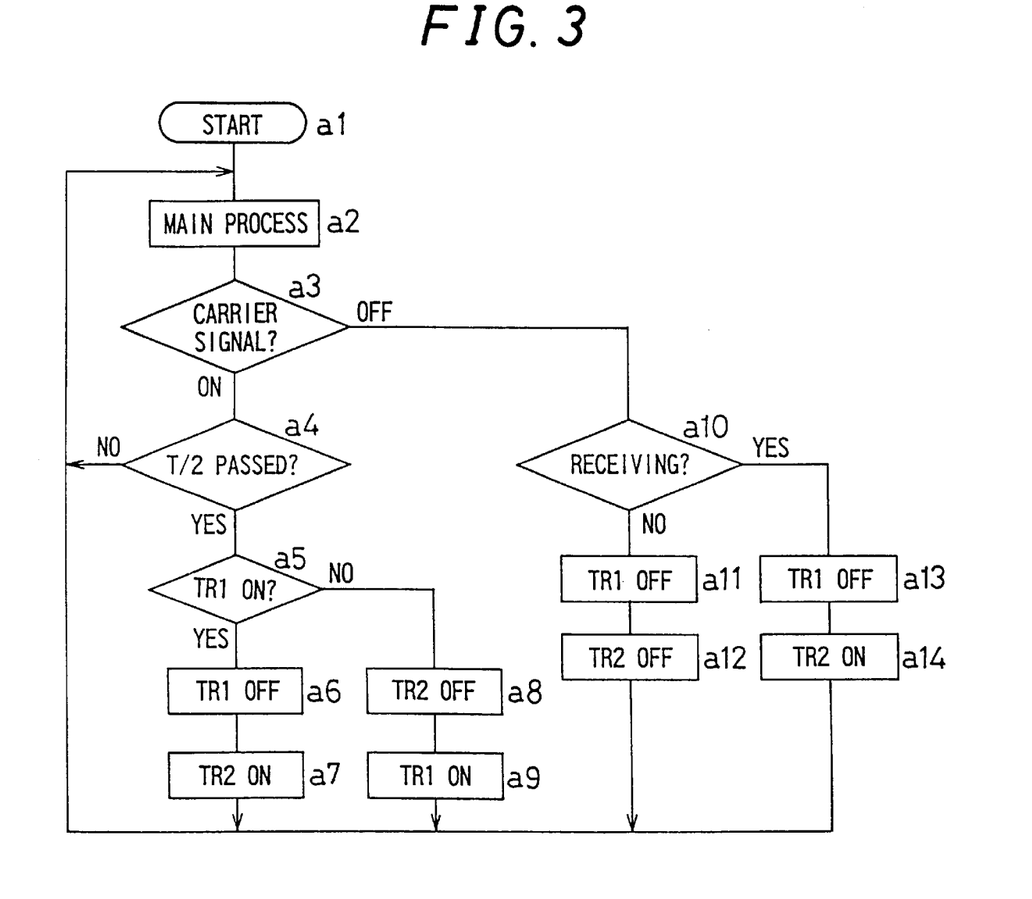
FIG. 3 is a flowchart showing an operation of a microcomputer shown in FIG. 2.

FIG. 3 shows an operation of the microcomputer 31 shown in FIG. 2. TR1, TR2 represent the transistors 29, 30. The operation starts at step a1, and a process according to a preset main program is performed at step a2. It is determined at step a3 whether the carrier signal is on or off. The carrier signal for control is, for example, a rectangular wave at a frequency of 120 to 130 kHz. Since the operational cycle time of the microcomputer 31 is shorter than a time T corresponding to one period of the carrier signal, many processing steps can be performed when the carrier signal is in either ON or OFF state.

When it is determined at step a3 that the carrier signal is on, the process proceeds to step a4 to determine whether a time T/2 which is one half of one period T of the carrier signal has passed or not. When it is determined that the time has not passed, the process returns to step a2. When it is determined at step a4 that the time T/2 has passed, it is determined at step a5 whether TR1 is in an ON state. When it is determined to be in the ON state, TR1 is turned off at step a6 and TR2 is turned on at step a7. When it is determined at step a5 that TR1 is not in the ON state, TR2 is turned off at step a8 and TR1 is turned on at step a2. The process returns to step a2 when step a7 or step a9 is complete.

When it is determined at step a3 that the carrier is off, the process proceeds to step a10 to determine whether reception is in progress or not. When it is determined that reception is not in progress, TR1 is turned off at step a11 and TR2 is turned off at step a12. That is, the transistor 29 and transistor 30 are both turned off. When it is determined at step a10 that reception is in progress, TR1 is turned off at step a13 and TR2 is turned on at step a14. That is, either the transistor 29 or 30 is turned on. The process returns to step a2 when step a12 or a14 is complete.

As described above, the microcomputer 31 drives TR1, TR2 such that they are alternately switched on and off every T/2 which is one half of the period T of the control signal to generate the alternating magnetic field 25 in accordance with the carrier signal. When the carrier signal is halted during transmission, both of TR1 and TR2 cut off to disconnect the resonant circuit. As a result, the strength of the magnetic field 25 rapidly attenuates. Further, either TR1 or TR2 is in the ON state during reception to keep the resonant circuit active. The switching between the ON state and OFF state is resumed when a carrier signal is required during reception.

Figure 4:
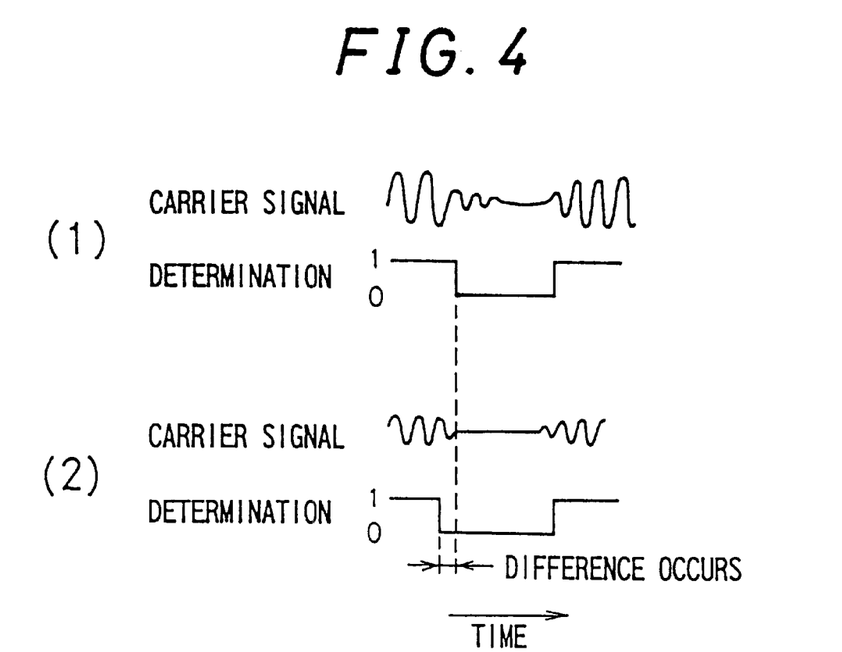
FIG. 4 is waveform diagrams for explaining effects of the embodiment in FIG. 1.

FIG. 4 shows a state wherein a difference occurs in data determined in the transponder between a case wherein a transponder is at a short distance as shown at (1) and a case wherein it is at a long distance as shown at (2) as encountered when attenuation is delayed during a halt period of a carrier signal as with a transponder according to the prior art. At the short distance, it is determined in the transponder that there is an input signal even in an attenuated portion thereof if the signal has sufficient strength. At the long distance, it is determined there is no input signal because of low signal strength. This results in the difference. According to this embodiment, the occurrence of such a difference between a short distance and a long distance can be avoided because attenuation occurs rapidly.

Figure 5:
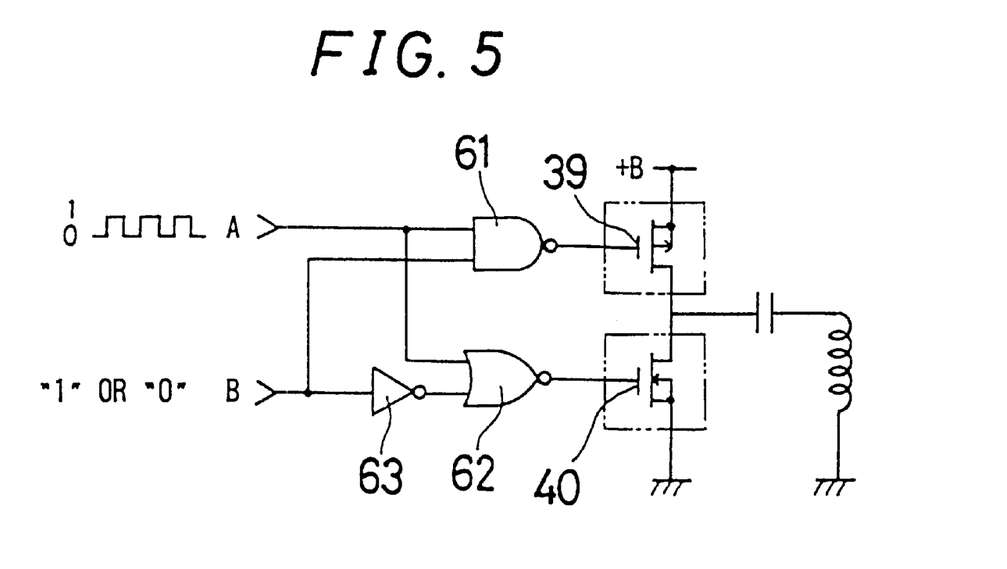
FIG. 5 is an electrical circuit diagram of another embodiment according to the fundamental configuration shown in FIG. 1.

FIG. 5 shows another embodiment according to the basic configuration shown in FIG. 1. In this embodiment, the controlling means includes a NAND gate 61, a NOR gate 62 and an inverter 63. The switching means includes a p-channel MOS type transistor 39 as the one switching element 23 and an n-channel MOS type transistor 40 as the another switching element 24. Gates of the transistors 39, 40 are driven by outputs of the NAND gate 61 and the NOR gate 62, respectively. A carrier signal in the form of a rectangular wave wherein logical values 1 and 0 are alternately repeated is supplied to inputs of the NAND gate 61 and the NOR gate 62 as A. A logical value 1 or 0 is supplied in accordance with data to the input of the NAND gate 61 and an input B of the NOR gate 62 through the inverter 63.

Figure 6:
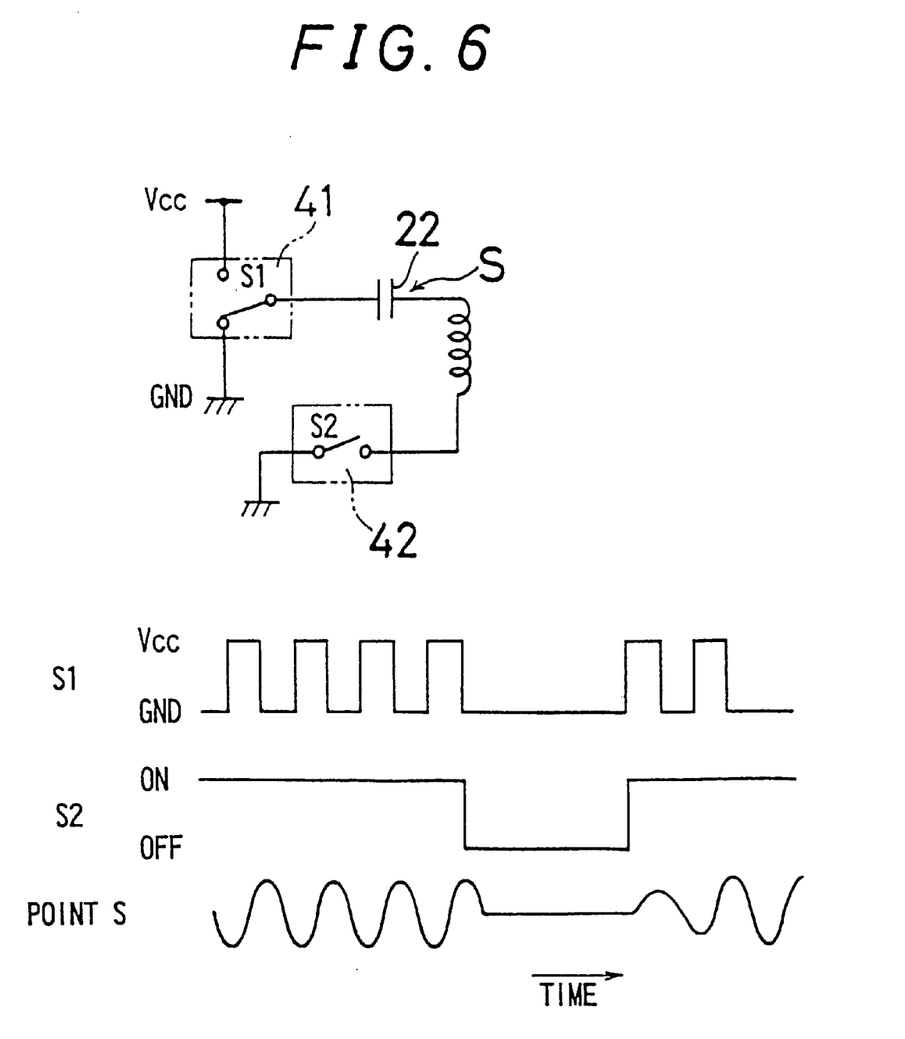
FIG. 6 is an electrical circuit diagram and waveform diagrams showing a fundamental configuration of still another embodiment of the invention.

FIG. 6 shows a fundamental configuration of still another embodiment of the invention in the upper half and operational waveforms of constituent parts thereof in the lower half. A change-over switching element 41 is connected between a resonant circuit and one output Vcc of a power supply. An on-off switching element 42 is connected between another end of the resonant circuit and ground which is another output of the power supply. The change-over switching element 41 is switched between a state wherein it connects one end of the resonant circuit to the one output Vcc of the DC power supply and a state wherein it connects it to the another output GND of the DC power supply in accordance with a carrier signal. The switching operation of this change-over switching element 41 is illustrated as the waveform S1 in the lower half. The on-off switching element 42 is switched between an ON state and an OFF state as indicated by S2 in the lower half. That is, in the range wherein the carrier signal continues, the change-over switching element 41 alternately switches between Vcc and GND and the on-off switching element 42 continues to be in a conducting state. In a halt period of the carrier signal, the change-over switching element 41 and the on-off switching element 42 are both in a cutoff state. As a result, the output waveform rapidly attenuates at a point S.

Figure 7:
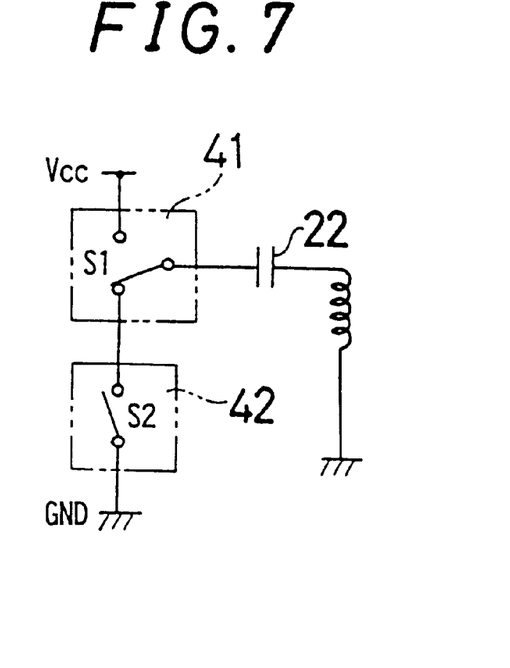
FIG. 7 is an electrical circuit showing a fundamental configuration of yet still another embodiment of the invention.

FIG. 7 shows a fundamental configuration of yet still another embodiment of the invention. In this embodiment, the on-off switching element 42 in the embodiment shown in FIG. 6 is connected between the change-over switching element 41 and the ground, and the another end of the resonant circuit is directly grounded. The control over the change-over switching element 41 and the on-off switching element 42 is carried out as in the embodiment shown in FIG. 6.

The embodiments shown in FIGS. 6 and 7 are effective in cases where both of the output transistors forming a half bridge can not be simultaneously turned off for reasons associated with the circuit configuration and the like.

Figure 8:
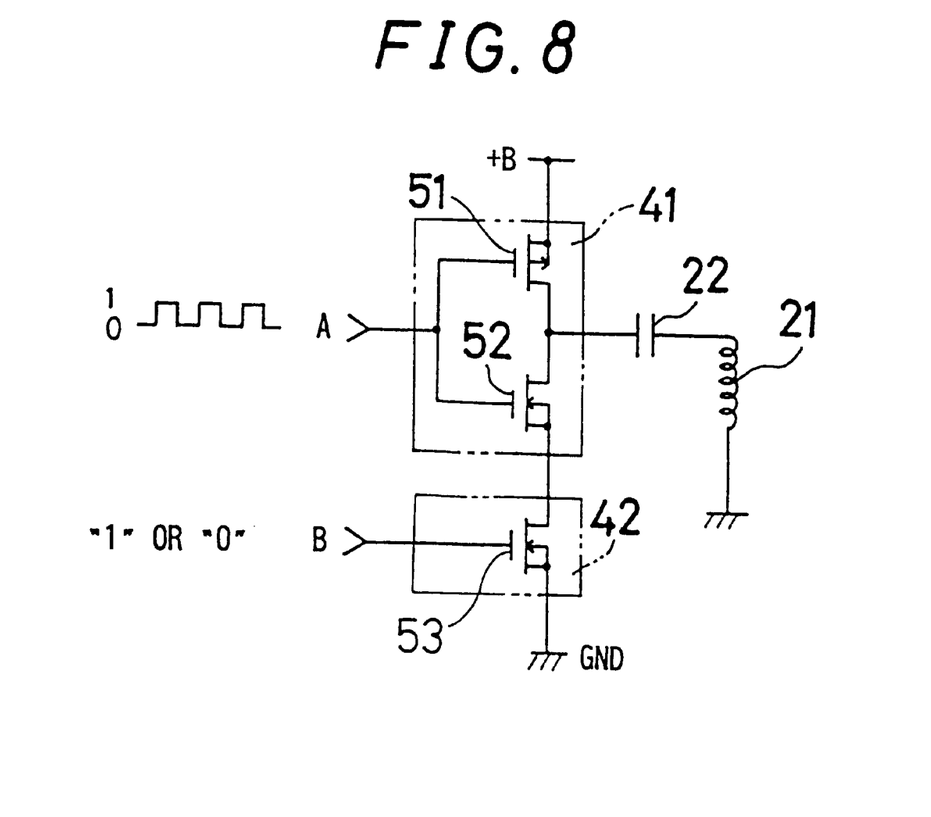
FIG. 8 is an electrical circuit diagram of the embodiment in FIG. 7.

FIG. 8 shows a configuration wherein the change-over switching element 41 in FIG. 7 is implemented using a p-channel MOS type transistor 51 and an n-channel MOS type transistor 52 and wherein the on-off switching element 42 is implemented using an n-channel MOS type transistor 53. Gates of the transistor 51 and transistor 52 are commonly driven by an input A. When the gates of the transistors 51, 52 are thus shorted or applied with the same logic, there is a possibility that the transistors 51, 52 are turned on simultaneously. In this case, the transistor 53 is provided to bring the gate potential to a logical value 0, thereby disconnecting the resonant circuit. During reception, the A-input is fixed to either of the logical values to put an input to the gate of the transistor 53 in an on state having a logical value 1, thereby causing the resonant circuit to operate actively. A carrier signal from an oscillation circuit is supplied at the A-input even during reception when a carrier signal is required.

Figure 9:
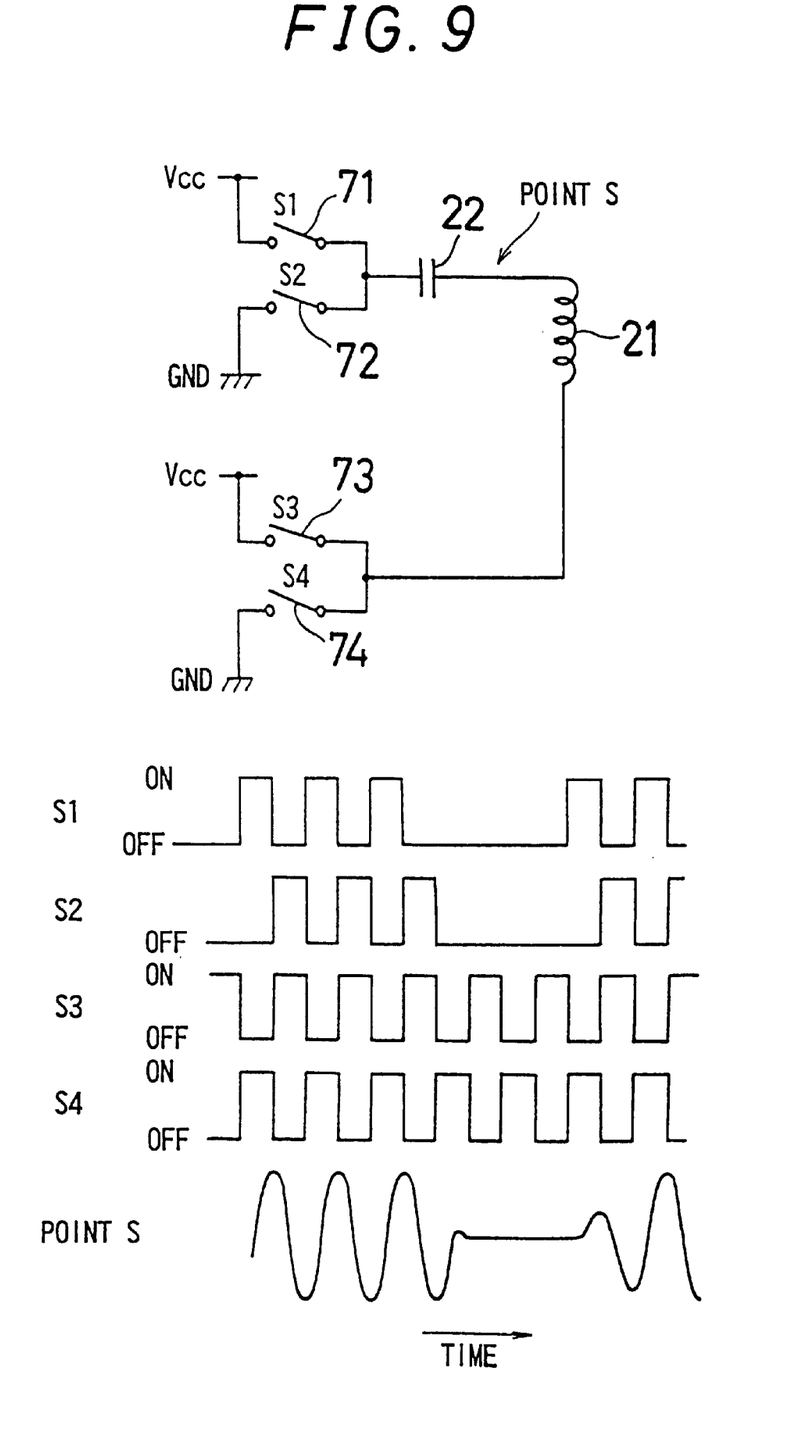
FIG. 9 is an electrical circuit diagram and waveform diagrams showing a fundamental configuration of a further embodiment of the invention.

FIG. 9 shows a fundamental configuration of a further embodiment of the invention in the upper half and operational waveforms of constituent parts thereof in the lower half. In this embodiment, a full bridge circuit is configured by a first switching element 71, a second switching element 72, a third switching element 73 and a fourth switching element 74. The operations of the first switching element 71 through fourth switching element 74 are performed as shown at S1 through S4 in the lower half. Specifically, S1 and S2 are repeated in alternate on and OFF states in opposite phases and are both in the OFF state during a halt period of a carrier signal. S3 and S4 are repeated in alternate on and OFF states in opposite phases, and S1 and S3 are in opposite phases and S1 and S4 are in the same phase. The signal at a point S has an amplitude of that of a half bridge and rapidly attenuates when S1 and S2 are both turned off. The first switching element 71 through fourth switching element 74 are implemented using semiconductor switching elements such as bipolar transistors or FETs. The combination of switching elements disconnected when the carrier signal is halted may be the third switching element 73 and fourth switching element 74. Alternatively, all of the switching elements 71 through 74 may be turned off simultaneously.

INDUSTRIAL APPLICABILITY

As described above, according to the invention, since the controlling means controls such that the switching means will not cause the resonant circuit to form a closed loop when a carrier signal is halted, a magnetic field generated by the antenna coil rapidly attenuates, allowing a transponder to recognize the halt state of the carrier signal accurately. This allows the transponder to accurately receive the carrier signal even when the repeat cycle of continuation and halt of the carrier signal is shortened, thereby allowing an improvement of the data transmission speed. Further, since attenuation during a halt of the carrier signal rapidly occurs, there is no possibility that the transponder receives a signal under attenuation during a halt of the carrier signal even when the transponder is close to the signal from the antenna coil, which allows transmission of an accurate signal to the transponder.

Further, according to the invention, since the controlling means controls such that the switching means will not cause the resonant circuit to form a closed loop when a carrier signal is halted, an electromagnetic wave generated by the antenna coil rapidly attenuates, allowing the transponder to recognize the halt state of the carrier signal accurately. This allows the transponder to accurately receive the carrier signal even when the repeat cycle of continuation and halt of the carrier signal is shortened, thereby allowing an improvement of the data transmission speed. Further, since attenuation during a halt of the carrier signal rapidly occurs, there is no possibility that the transponder receives a signal under attenuation during a halt of the carrier signal even when the transponder is close to the signal from the antenna coil, which allows transmission of an accurate signal to the transponder.

Further according to the invention, the resonant circuit is driven in accordance with a carrier signal by switching the one switching element and the another switching element such that they are in opposite phases, and both of the one switching element and the another switching element are disconnected when the carrier signal is halted. This makes it possible to attenuate an electromagnetic wave generated by the antenna coil rapidly.

Further, according to the invention, the change-over switch element intervenes when a closed loop including a DC power supply is formed in the resonant circuit, and the change over switching element and the on-off switching element intervene when a closed loop excluding a DC power supply is formed. Reliable switching is possible even when electrical resistance is not necessarily sufficiently high in implementing the switching elements using semiconductor switching elements.

Further, according to the invention, a so-called full bridge is formed by the first through fourth switching elements to make it possible to generate a voltage which is twice the output voltage of a DC power supply at the antenna coil. Since either the first and second switches or the third and fourth switches cut off simultaneously, the closed loop in the resonant circuit is disconnected to allow the carrier to attenuate rapidly.

Further, according to the invention, a signal from a transponder can be received with high sensitivity because the resonant circuit maintains a closed loop.

What is claimed is:

1. An antenna driving device for a transponder which drives an antenna coil in accordance with a carrier signal in order to generate a magnetic field for a magnetically coupled transponder, the device comprising:

a resonant circuit in which an antenna coil and a resonant capacitor are connected in series;

switching means for alternately switching between a state in which the resonant circuit forms a closed loop including a DC power supply for providing a current flowing in one direction, and a state in which a closed loop is formed for providing a current flowing in another direction in accordance with the carrier signal; and controlling means for controlling the switching means such that the closed loop of the resonant circuit is maintained when the carrier signal continues and such that the closed loop of the resonant circuit is disconnected when the carrier signal is halted.

2. The antenna driving device for a transponder of claim 1, wherein the switching means comprises:

one switching element connected between one output of the DC power supply and one end of the resonant circuit and alternately switched between a conducting state and a cutoff state in accordance with the carrier signal; and another switching element connected between another output of the DC power supply and the one end of the resonant circuit and alternately switched between a conducting state and a cutoff state in accordance with the carrier signal, such that the another switching element is in a phase opposite to that of the first switching element, and wherein the controlling means controls such that the first and second switching elements are simultaneously in the cutoff states when the carrier signal is halted.

3. The antenna driving device for a transponder of claim 1, wherein the switching means comprises:

a change-over switching element for switching such that one end of the resonant circuit is alternately connected to the one and another outputs of the DC power supply in accordance with the carrier signal; and an on off switching element connected to another end of the resonant circuit and the another output of the DC power supply, which is in a conducting state when the carrier signal continues, and wherein the controlling means controls such that the on-off switching element is in a cutoff state when the carrier signal is halted.

4. The antenna driving device for a transponder of claim 1, wherein the switching means comprises a change-over switching element and an on-off switching element;

the change-over switching element is alternately switched to connect one end of the resonant circuit to one output of the DC power supply, or to connect the one end of the resonant circuit to the another output of the DC power supply through the on-off switching element in accordance with the carrier signal; and the controlling means controls such that the on-off switching element is in a conducting state when the carrier signal continues and the on-off switching element is in a cutoff state when the carrier signal is halted.

5. The antenna driving device for a transponder of claim 1, wherein the switching means comprises:

a first switching element for connecting or disconnecting one end of the resonant circuit and one output of the DC power supply in accordance with the carrier signal;

a second switching element for connecting or disconnecting the one end of the resonant circuit and another output of the DC power supply in accordance with the carrier signal such that the second switching element is in a phase opposite to that of the first switching element;

a third switching element for connecting or disconnecting another end of the resonant circuit and the one output of the DC power supply in accordance with the carrier signal such that the third switching element is in the phase opposite to that of the first switching element;

a fourth switching element for connecting or disconnecting the another end of the resonant circuit and the another output of the DC power supply in accordance with the carrier signal such that the fourth switching element is in the same phase as that of the first switching element, and wherein the controlling means controls such that at least either the first and second switching elements or the third and fourth elements are simultaneously in a cutoff state when the carrier signal is halted.

6. The antenna driving device for a transponder of claim 1, wherein the controlling means controls the switching means such that the resonant circuit forms a closed loop to allow reception of a signal from the transponder.

7. An antenna driving device for a transponder which drives an antenna coil in accordance with a carrier signal for supplying electric power to a magnetically coupled transponder, the device comprising:

a resonant circuit in which an antenna coil and a resonant capacitor are connected in series;

switching means for alternately switching between a state in which the resonant circuit forms a closed loop including a DC power supply for providing a current flowing in one direction, and a state in which a closed loop is formed for providing a current flowing in another direction in accordance with the carrier signal; and controlling means for controlling the switching means such that the closed loop of the resonant circuit is maintained when the carrier signal continues and such than the closed loop of the resonant circuit is disconnected when the carrier signal is halted.

8. The antenna driving device for a transponder of claim 7, wherein the switching means comprises:

one switching element connected between one output of the DC power supply and one end of the resonant circuit and alternately switched between a conducting state and a cutoff state in accordance with the carrier signal; and another switching element connected between another output of the DC power supply and the one end of the resonant circuit and alternately switched between a conducting state and a cutoff state in accordance with the carrier signal, such that the another switching element is in a phase opposite to that of the first switching element, and wherein the controlling means controls such that the first and second switching elements are simultaneously in the cutoff states when the carrier signal is halted.

9. The antenna driving device for a transponder of claim 7, wherein the switching means comprises:

a change-over switching element for switching such that one end of the resonant circuit is alternately connected to the one and another outputs of the DC power supply in accordance with the carrier signal; and an on-off switching element connected to another end of the resonant circuit and the another output of the DC power supply, which is in a conducting state when the carrier signal continues, and wherein the controlling means controls such that the on-off switching element is in a cutoff state when the carrier signal is halted.

10. The antenna driving device for a transponder of claim 7, wherein the switching means comprises a change-over switching element and an on-off switching element;

the change-over switching element is alternately switched to connect one end of the resonant circuit to one output of the DC power supply, or to connect the one end of the resonant circuit to the another output of the DC power supply through the on-off switching element in accordance with the carrier signal; and the controlling means controls such that the on-off switching element is in a conducting state when the carrier signal continues and the on-off switching element is in a cutoff state when the carrier signal is halted.

11. The antenna driving device for a transponder of claim 7, wherein the switching means comprises:

a first switching element for connecting or disconnecting one end of the resonant circuit and one output of the DC power supply in accordance with the carrier signal;

a second switching element for connecting or disconnecting the one end of the resonant circuit and another output of the DC power supply in accordance with the carrier signal such that the second switching element is in a phase opposite to that of the first switching element;

a third switching element for connecting or disconnecting another end of the resonant circuit and the one output of the DC power supply in accordance with the carrier signal such that the third switching element is in the phase opposite to that of the first switching element;

a fourth switching element for connecting or disconnecting the another end of the resonant circuit and the another output of the DC power supply in accordance with the carrier signal such that the fourth switching element is in the same phase as that of the first switching element, and wherein the controlling means controls such that at least either the first and second switching elements or the third and fourth elements are simultaneously in a cutoff state when the carrier signal is halted.

12. The antenna driving device for a transponder of claim 7, wherein the controlling means controls the switching means such that the resonant circuit forms a closed loop to allow reception of a signal from the transponder.

\* \* \* \* \*